(12) United States Patent
Raman et al.

(10) Patent No.: US 12,184,673 B2
(45) Date of Patent: Dec. 31, 2024

(54) METHOD FOR DETECTING RDP LOGIN ANOMALY

(71) Applicant: BULL SAS, Les Clayes-sous-Bois (FR)

(72) Inventors: Ravi Raman, Bangalore (IN); Vinod Vasudevan, Fairfax, VA (US)

(73) Assignee: BULL SAS, Les Clayes-sous-Bois (FR)

( * ) Notice: Subject to any disclaimer, the term of this patent is extended or adjusted under 35 U.S.C. 154(b) by 364 days.

(21) Appl. No.: 17/851,183

(22) Filed: Jun. 28, 2022

(65) Prior Publication Data

US 2023/0017622 A1 Jan. 19, 2023

(30) Foreign Application Priority Data

Jun. 30, 2021 (EP) .................................... 21182975

(51) Int. Cl.
*H04L 9/40* (2022.01)
*G06F 17/18* (2006.01)

(52) U.S. Cl.
CPC .......... *H04L 63/1416* (2013.01); *G06F 17/18* (2013.01)

(58) Field of Classification Search
None
See application file for complete search history.

(56) References Cited

U.S. PATENT DOCUMENTS 11,290,483 B1 * 3/2022 Kannan ............... H04L 63/1433
2021/0185084 A1 6/2021 Sodja et al.

OTHER PUBLICATIONS

European Search Report issued in EP21182975, dated Dec. 10, 2021 (2 pages).
Denning, et al., "An Intrusion-Detection Model", IEEE Transactions on Software Engineering IEEE Service Center, Feb. 1, 1987; pp. 222-232.
Powell, Brian, "Detecting malicious logins as graph anomalies", Cornell University Library, Sep. 19, 2019.
Kruegel, et al., "Anomaly detection of web-based attacks", Proceedings of the 10$^{th}$ ACM Conference on Computer and Communications Security, Oct. 27, 2003; pp. 251-261.

* cited by examiner

*Primary Examiner* — William J. Goodchild
(74) *Attorney, Agent, or Firm* — ARC IP Law, PC; Joseph J. Mayo

(57) ABSTRACT

A method for detecting malicious connections from remote users into a computer network through Remote Desktop protocol via a computer having access to login logs of users. The method includes defining aspects, each divided into bins comprising a day of week aspect comprising n1 bins, a time of day aspect comprising n2 bins, a number of logins in a day aspect comprising n3 bins. The method includes defining a model based on the aspects and providing a score of log for each user; defining a baseline of log; applying the model on each user log to determine a production score of log and comparing the production score of log with respect to the baseline. The model includes calculating a probability density for each bin for each user, determining a weight for each aspect and calculating the score of log from the probability density weighted by the weight for each user.

11 Claims, 2 Drawing Sheets

METHOD FOR DETECTING RDP LOGIN ANOMALY

This application claims priority to European Patent Application Number 21182975.9, filed 30 Jun. 2021, the specification of which is hereby incorporated herein by reference.

BACKGROUND OF THE INVENTION

Field of the Invention

Embodiments of the invention relate to a method for detecting malicious connections from remote users into a computer network through Remote Desktop protocol.

Description of the Related Art

Though Remote Desktop Protocol can be enough of a security risk on its own, organizations often compound the vulnerabilities by failing to properly secure RDP accounts and services. Accounts with RDP privileges may have a weak password or no additional layers of security. Those flaws open the door for brute force attacks in which cybercriminals use automated tools to obtain the account password. If successful, the attackers can then invade a network, elevate their rights with administrative access, disable security products, and even run ransomware to encrypt critical data and hold it hostage.

An object of one or more embodiments of the invention is to monitor the remote logins made through RDP by employees and other individuals connected with an organization.

Another object of one or more embodiments of the invention is to provide a method which makes it possible to effectively detect malicious connections.

BRIEF SUMMARY OF THE INVENTION

These and other objects of one or more embodiments of the invention are achieved by providing a method for detecting malicious connections from remote users into a computer network through Remote Desktop protocol, the method being carried out by a computer having access to login logs of users, according to one or more embodiments, the method comprising the following steps:
defining at least three aspects, each divided into several bins as follows:
a day of week aspect comprising n1 bins,
a time of day aspect comprising n2 bins,
a number of logins in a day aspect comprising n3 bins; n1, n2 and n3 being integers,
defining a model based on the aspects and providing a score of log for each user;
training the model on each user log during a training period in order to define a baseline of log; malicious connections producing a score which is greater than the baseline and which is considered as an anomaly score,
during the production, applying the model on each user log to determine a production score of log and comparing the production score of log with respect to the baseline,
wherein the model comprising:
calculating a probability density for each bin for each user,
determining a weight for each aspect,
calculating the score of log from the probability density weighted by the determined weight for each user.

Advantageously, the approach of one or more embodiments of the invention is to monitor the behavior of a user over a period of time. Various parameters comprising what time of the day does the user usually login, or what days of the week does a user login in and the number of logins in a day can be plotted over a period of time to determine a baseline of the behavior of a user. Based on this baselined behavior, a deviation can be determined and if there is a deviation then it could be flagged as an anomaly.

The method according to one or more embodiments of the invention concerns a login profiling for each user.

The method according to one or more embodiments of the invention can in particular be considered as remarkable as it provides different importance to the Aspects by weighing each Aspect's probability density.

In other words, one or more embodiments of the invention controls the behavior of each user by processing logs of the users. The behavior of the user is processed by taking into account the number of connections and time slots of the connections during a day and during a week.

Through the anomalous behavior, instances of RDP compromise can be determined.

According to at least one embodiment of the invention, for a user c, the probability density $P_a(b|c)$ of a bin b for an aspect a can be calculated using the formula:

$P_a(b|c)$=(number of login transactions for a production period for the bin+1)/(total transactions for the user c for the aspect+number of total bins in the aspect $a$)

The calculation of probability density makes it possible to measure the frequency of bins.

According to at least one embodiment of the invention, the weight for each aspect may consist in determining importance $I_a(c)$ of aspect a for user c using the formula:

$$I_a(c) = \sum_{b \in a} \left[ P_a(b \mid c) * \log_{B(a)}\left(\frac{1}{P_a(b \mid c)}\right) \right]$$

wherein for a user c, $P_a(b|c)$ is the probability density of a bin b for an aspect a; B(a) is the total number of bins in the aspect a.

The calculation of the importance makes it possible to assign a different weight to each aspect.

According to at least one embodiment of the invention, the score of log can be calculated using the formula:

$$FR1(x \mid c) = 1 - \left( \prod_{a=1}^{A} P_a(b \mid c)^{I_a(c)} \right)^{\frac{1}{I(c)}}$$

wherein anomaly score of log record x for a user c, $P_a(b|c)$ is the probability density of a bin b for an aspect a; A is the total number of aspects a; $I_a(c)$ is the Importance of aspect a for user c; and I(c) is the sum of all Importances of the all aspects.

Advantageously, in at least one embodiment, n1 can be equal to seven. Thus, the aspect concerning the day of week is divided into seven bins, each corresponding to a day of the week.

Advantageously, in at least one embodiment, n2 can be equal to twenty-four. Thus, the aspect concerning the time of day is divided into twenty-four bins, each corresponding to an hour of the day.

Advantageously, in at least one embodiment, n3 can be equal to six. Thus, the aspect concerning the number of logins in a day is divided into six bins, each corresponding to a range of values.

According to one or more embodiments of the invention, the training period can be equal to several days, preferably one month.

The model according to at least one embodiment of the invention can be trained for a month to establish the baseline for the users under scope.

According to at least one embodiment of the invention, during the production, the model can be regularly applied at a production frequency which is equal to one day. In other words, once trained, the model can be run every day in a production mode and processes the logs of that day. Each log is scored with the Anomaly Score.

According to at least one embodiment of the invention, it is proposed a computer program comprising instructions which, when the program is executed by a processing unit, cause the processing unit to carry out the steps of the method as described above.

At least one embodiment of the invention also concerns a non-transitory computer-readable storage medium encoded with computer-executable instructions which, when executed, perform the method as described above.

BRIEF DESCRIPTION OF DRAWINGS

Further advantages and characteristics of one or more embodiments of the invention will become apparent on examining the detailed description of an embodiment, which is in no way limitative, and the attached drawings, in which.

DETAILED DESCRIPTION OF THE INVENTION

Figure 1:
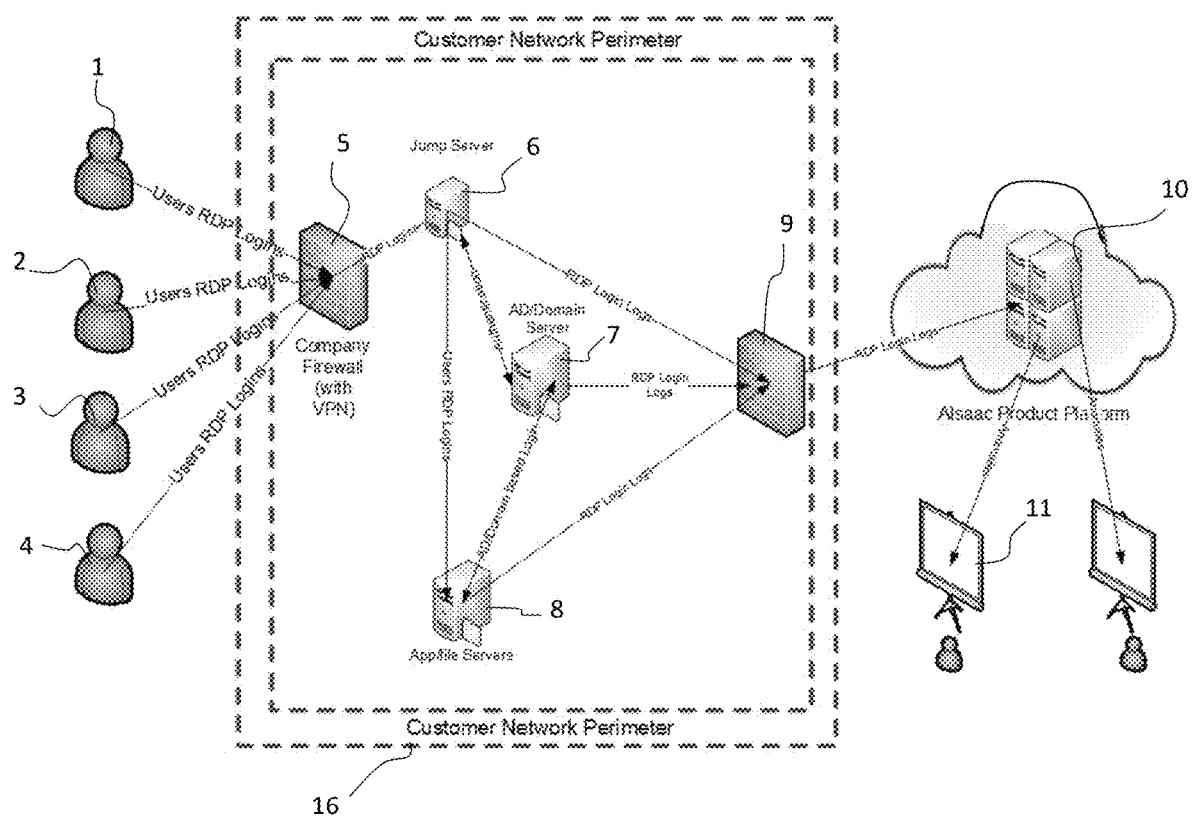
FIG. 1 is a schematic view of a system wherein the method according to one or more embodiments of the invention is carried out.

While one or more embodiments of the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the embodiments of the invention as defined by the appended claims.

Hereinafter, embodiments of the invention will be described in detail by explaining exemplary embodiments of the invention with reference to the attached drawings.

In accordance with at least one embodiment, the method and system according to the invention relate to the following materials and processes:

Embodiments herein include computer-implemented methods, tangible non-transitory computer-readable mediums, and systems. The computer-implemented methods may be executed, for example, by a processor that receives instructions from a non-transitory computer-readable storage medium. Similarly, a system described herein may include at least one processor and memory, and the memory may be a non-transitory computer-readable storage medium. As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

On FIG. 1, users 1 to 4 login from remote locations to the company network 12 comprising several servers 6-8. This is through the protocol called Remote Desktop Protocol (RDP). The users login to various types of company servers such as database servers, application servers, FTP servers, file servers, email servers, etc. The logins generally happen through a firewall 5 setup by the company.

As the users login to a server, the server creates a record of each login. This is referred to as the Login logs. These are stored in a logging system inside the servers.

So, as the users login to the servers on a regular basis, the login records get created and these are forwarded automatically to a platform 10 running the method according to the present invention. The platform 10 can be one or several computers arranged inside or outside the network 12 and connected through a firewall 9.

The method according to at least one embodiment of the invention analyses the user's login logs to determine if there is a deviation in the user's login pattern which is the user login behavior.

If there is a change in the established behavior of the user's login, then the method according to at least one embodiment of the invention flags that login record as an anomaly. In this manner, malicious external actors who might have stolen the credentials of a user and are using those credentials to login to the company servers, can be identified since such actors will, in all probability, login to the servers at times/days/frequency not normal to the behavioral pattern of the user.

When anomalies are detected by the method according to at least one embodiment of the invention, these can be shown on the front end screens 11 of the platform 10 which are for example being monitored by a Security Operations Center (SOC) teams.

Such anomalies are further analyzed by the SOC teams to determine if the anomaly were indeed a breach or if this were a genuine deviation (false positive).

The model according to at least one embodiment of the invention uses the RDP logs of user remote logins. Windows® event id 4624 logs of type interactive are considered.

This model comprises calculation steps based on three aspects:

The Aspects that have been selected for this model are the following:

1. Aspect 1=Day of Week (DOW)
2. Aspect 2=Time of Day (TOD)
3. Aspect 3=Number of Logins in a Day (Login Count)

Since the model is probability based, for each of the Aspects, frequency bins are setup for each value or range of values.

The bins have been setup as below:
DOW: 7 bins
TOD: 24 bins
CountofLogins: 6 bins The model scores each log on a scale of 0 to 1. For example, the baseline can be determined as being equal to 0.7. Therefore, a score of 0.7 and above can mean an anomaly. It means there is a behavioral change in the RDP login pattern for the user.

The model can be trained for some days or a month to establish the baseline for the users under scope. Once trained, the model runs every day in a production mode and processes the logs of that day. Each log is scored with the Anomaly Score. Any score greater than 0.7 will be flagged as an Anomaly.

The following table contains training bins of a user for the various Aspects based on the 30 days model run:

| Example for the RDP Model-Training Bins | | | |
|---|---|---|---|
| User Name | DOW Bins | TOD Bins | Count Bins |
| User1 | Mon | t_20_24 | c_0_5 |
| User1 | Mon | t_20_24 | c_0_5 |
| User1 | Tue | t_8_12 | c_0_5 |
| User1 | Wed | t_12_16 | c_0_5 |
| User1 | Thu | t_12_16 | c_0_5 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Sun | t_12_16 | c_10_15 |
| User1 | Mon | t_20_24 | c_0_5 |
| User1 | Mon | t_16_20 | c_0_5 |
| User1 | Mon | t_12_16 | c_0_5 |
| User1 | Tue | t_12_16 | c_0_5 |
| User1 | Thu | t_12_16 | c_0_5 |
| User1 | Thu | t_16_20 | c_0_5 |
| User1 | Thu | t_16_20 | c_0_5 |
| User1 | Fri | t_8_12 | c_0_5 |
| User1 | Fri | t_12_16 | c_0_5 |

The calculations carried out by the model is described with respect to FIG. 2 below.

The training step makes it possible to determine the baseline by using for example a machine learning technique. The statistics of the trained model are as follow:

| | DOW | | | | | | |
|---|---|---|---|---|---|---|---|
| User_name | Sun | Mon | Tue | Wed | Thu | Fri | Total |
| User1 | 13 | 5 | 2 | 1 | 4 | 2 | 27 |

| | TOD | | | | |
|---|---|---|---|---|---|
| User_name | t_12_16 | t_16_20 | t_20_24 | t_8_12 | Total |
| User1 | 19 | 3 | 3 | 2 | 27 |

| | COUNT | | |
|---|---|---|---|
| User_name | C_0_5 | C_10_15 | Total |
| User1 | 14 | 13 | 27 |

Figure 2:
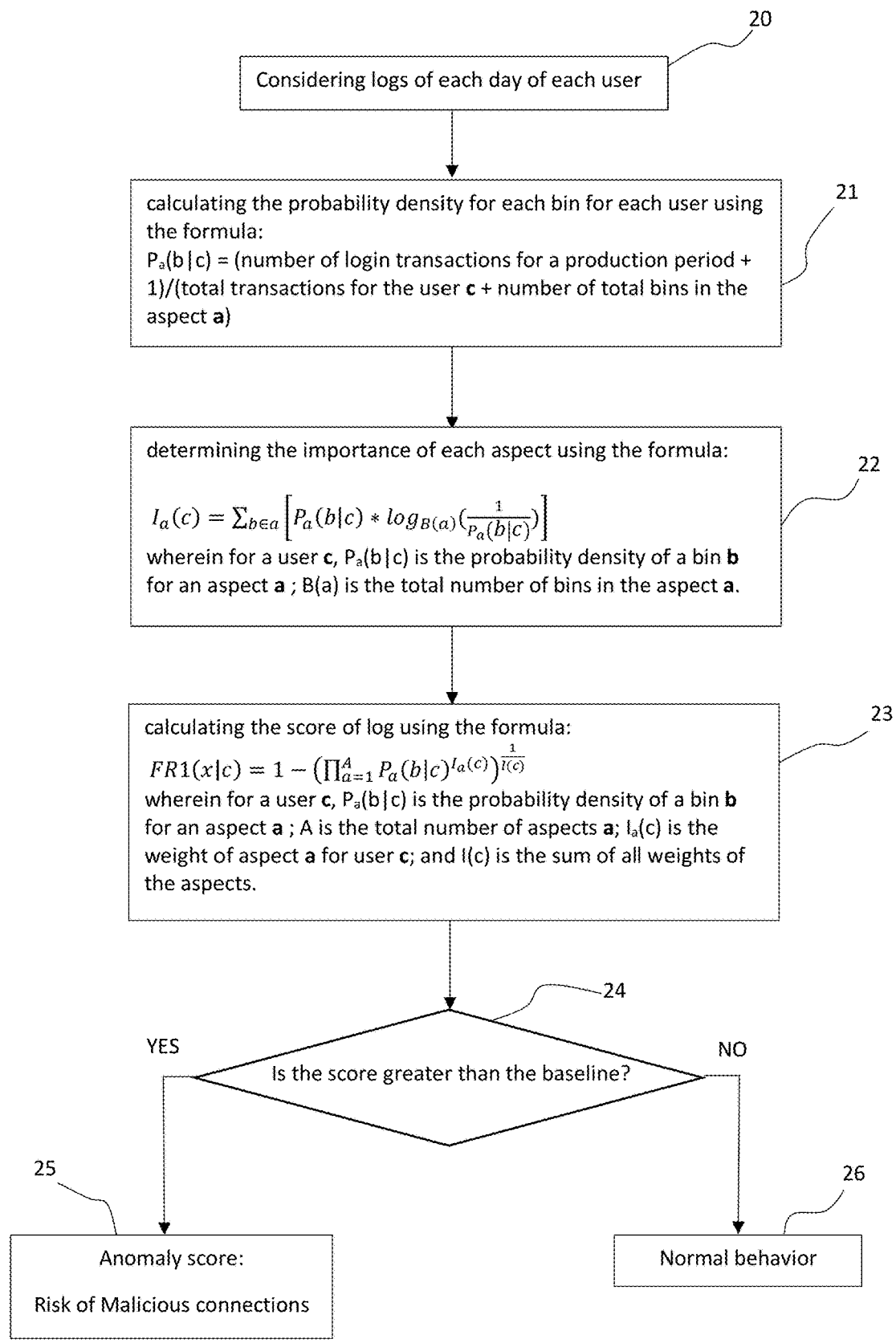
FIG. 2 is a schematic view of an organigram of an exemplified embodiment of the model according to one or more embodiments of the invention.

FIG. 2 is a schematic view showing different steps of an exemplified embodiment of the model according to the invention to calculate the score.

At step 20 logs of each day of each user are considered.

The step 21 concerns the calculation of the probability Density for each Bin for each user using the formula:

$$P_a(b|c) = (\text{number of login transactions for a production period} + 1)/(\text{total transactions for the user } c + \text{number of total bins in the aspect } a)$$

The formula makes it possible to compute the probability density for each bin in each Aspect.

The bins setup for each Aspect can be the following:
DOW=Mon, Tue, Wed, Thu, Fri, Sat, Sun
TOD=t_12_16, t_16_20, t_20_24, t_8_12
Login Count=c_0_5, c_10_15

The following table shows the computation of the probability densities:

| Probability density of each bin of every aspect | (Frequency of bin + 1)/(combine frequency of all bin + number of total bins in aspect) |
|---|---|
| DOW | |
| Sun | (13 + 1)/(27 + 7) = 14/34 = 0.411764058823529 |
| Mon | 0.176470588 |
| Tue | 0.088235294 |
| Wed | 0.058823529 |
| Thu | 0.147058824 |
| Fri | 0.088235294 |
| TOD | |
| t_24_4 | 0.03030303 |
| t_4_8 | 0.03030303 |
| t_8_12 | 0.090909091 |
| t_12_16 | 0.606060606 |
| t_16_20 | 0.121212121 |
| t_20_24 | 0.121212121 |
| COUNT | |
| C_0_5 | 0.454545455 |
| C_10_15 | 0.424242424 |

The step 22 concerns the calculation of the importance for each aspect using the formula:

$$I_a(c) = \sum_{b \in a} \left[ P_a(b|c) * \log_{B(a)}\left(\frac{1}{P_a(b|c)}\right) \right]$$

wherein for a user c, $P_a(b|c)$ is the probability density of a bin b for an aspect a; $B(a)$ is the total number of bins in the aspect a.

In other words, the important of each Aspect of User=1−SUM(probability Value of bins*log(1/probability Value of bins, base=number of total bins in aspects))

For example, for Day-of-week, it is 1−(sum for i=1 to 7, ((d(i))*log (1/d(i), base=7)); d(i) being the probability density.

The following table shows the computation of the importance:

| Importance of every aspect for user | 1 − sum(probability value*log(probability value, base = number of total bins in aspects)) |
|---|---|
| Count | 1 − ((0.454545455*log(0.454545455, base = 6)) + (0.424242424*log(0.424242424, base = 6)) = 0.596956797669162 |
| Tod | 0.423439637 |
| Dow | 0.204252899 |

Step 23 concerns the calculation of the score of log using the formula:

$$FR1(x \mid c) = 1 - \left( \prod_{a=1}^{A} P_a(b \mid c)^{I_a(c)} \right)^{\frac{1}{I(c)}}$$

wherein for a user c, $P_a(b|c)$ is the probability density of a bin b for an aspect a; A is the total number of aspects a; $I_a(c)$ is the Importance of aspect a for user c; and I(c) is the sum of all Importances of the aspects.

A score of each bin of every aspect is calculated using the following formula:

$$\left( \prod_{a=1}^{A} P_a(b \mid c)^{I_a(c)} \right)^{\frac{1}{I(c)}}$$

Otherwise: (probability value of bin found in production) power of (importance aspect).

For example: p(tue) power of importance ast of dow*p (t_4_8) power of importance aspect of tod*p(c_0_5) power of importance aspect of count.

The calculation concerns a product of each Aspect.

Then, the product of all scores of each bin of every aspects is calculated:

1−((probability value of bin found in production) Power of (importance aspect)) Power of (1/sum of all importance aspect)

For example:

1−(p(tue) power of importance aspect of dow*p (t_4_8) power of importance aspect of tod*p (c_0_5) power of importance aspect of count) Power of (1/SUM(importance aspect of dow/ tod/count))

At step 24, a comparison is carried out between the determined score and the baseline.

If the score is under the baseline, at step 26, it is a normal behavior.

The following table shows the computation of score for a normal behavior:

| Anomaly score for user when not deviated | 1 − (sum(probability value of bins)/sum(importance of dow + tod + count) |
|---|---|
| Score of each bin of every aspect | Probability value of bin found in production power of importance aspect of corresponding bin |
| Score of TOD | 0.609038 |
| Score of Count | 0.808925782 |
| Score of DOW | 0.599379249 |
| PRODUCT OF ALL SCORES OF EACH BIN OF EVERY ASPECT | 0.295294101 |
| Anomaly score for Log Record | 0.6307 |

If the score is greater than the baseline, at step 25, there is an anomaly score. Thus there is a risk of malicious connections.

The following table shows the computation of score for an abnormal behavior:

| Anomaly score for user when not deviated | 1 − (sum(probability value of bins)/sum(importance of dow + tod + count) |
|---|---|
| Score of each bin of every aspect | Probability value of bin found in production power of importance aspect of corresponding bin |
| Score of TOD | 0.609038 |
| Score of Count | 0 |
| Score of DOW | 0.624580546 |
| PRODUCT OF ALL SCORES OF EACH BIN OF EVERY ASPECT | 0 |
| Anomaly score for Log Record | 1 |

The model according to one or more embodiments of the invention first runs in a training mode for 30 days for example. During this time, the baseline behavior of the users is determined. Then on a daily basis, the model runs to determine if there are any deviations to the baselined behavior.

Advantageously, in at least one embodiment, the model uses a customized formula to determine the Anomaly Score. This model is based on giving different importance to the Aspects based on each Aspect's density model.

Numerous variations and modifications will become apparent to those skilled in the art once the above disclosure is fully appreciated.

What is claimed is:

1. A method for detecting malicious connections from remote users into a computer network through Remote Desktop protocol, the method being carried out by a computer having access to login logs of users, the method comprising:
defining at least three aspects, each divided into several bins stored on memory of said computer and comprising
a day of week aspect comprising n1 bins,
a time of day aspect comprising n2 bins,
a number of logins in a day aspect comprising n3 bins,
wherein n1, n2 and n3 are integers; defining a model based on the at least three aspects and providing a score of log for each user; training the model on each user log during a training period in order to define a baseline of log,
wherein malicious connections produce a score which is greater than the baseline and which is considered as an anomaly score;
during production of the score, applying the model on said each user log to determine a production score of log and comparing the production score of log with respect to the baseline,
wherein the model comprises calculating a probability density for each bin for said each user,
determining a weight for each aspect of said at least three aspects, calculating the score of log from the probability density weighted by the weight determined for said each user.

2. The method according to claim 1, wherein, for a user c, the probability density as $P_a(b|c)$ of a bin b for an aspect a is calculated using:

$P_a(b|c)$=(number of login transactions for a production period for the bin $b$+1)/(total transactions for the user $c$ for the aspect $a$+number of total bins in the aspect $a$).

3. The method according to claim 1, wherein the weight for each aspect consists in determining importance $I_a(c)$ of aspect a for user c using:

$$I_a(c) = \sum_{b \in a} \left[ P_a(b \mid c) * \log_{B(a)} \left( \frac{1}{P_a(b \mid c)} \right) \right]$$

wherein for said user c, $P_a(b|c)$ is the probability density of a bin b for said aspect a; B(a) is a total number of bins in the aspect a.

4. The method according to claim 1, wherein the score of log is calculated using:

$$FR1(x \mid c) = 1 - \left( \prod_{a=1}^{A} P_a(b \mid c)^{I_a(c)} \right)^{\frac{1}{I(c)}}$$

wherein said anomaly score of log record x for a user c, $P_a(b|c)$ is the probability density of a bin b for an aspect a; A is a total number of aspects a; $I_a(c)$ is an Importance of said aspect a for said user c; and I(c) is a sum of Importance of the total number of aspects.

5. The method according to claim 1, wherein said n1 is equal to seven.

6. The method according to claim 1, wherein said n2 is equal to twenty-four.

7. The method according to claim 1, wherein said n3 is equal to six.

8. The method according to claim 1, wherein the training period is equal to several days or one month.

9. The method according to claim 1, wherein during the production, the model is regularly applied at a production frequency which is equal to one day.

10. A computer program comprising instructions which, when the computer program is executed by a processing unit, cause the processing unit to carry out a method for detecting malicious connections from remote users into a computer network through Remote Desktop protocol, the method being carried out by a computer having access to login logs of users, the method comprising:

defining at least three aspects, each divided into several bins stored on memory of said computer and comprising a day of week aspect comprising n1 bins,
a time of day aspect comprising n2 bins,
a number of logins in a day aspect comprising n3 bins,
wherein n1, n2 and n3 are integers;
defining a model based on the at least three aspects and providing a score of log for each user;
training the model on each user log during a training period in order to define a baseline of log,
wherein malicious connections produce a score which is greater than the baseline and which is considered as an anomaly score;
during production of the score, applying the model on said each user log to determine a production score of log and comparing the production score of log with respect to the baseline,
wherein the model comprises
calculating a probability density for each bin for said each user,
determining a weight for each aspect of said at least three aspects,
calculating the score of log from the probability density weighted by the weight determined for said each user.

11. A non-transitory computer-readable storage medium encoded with computer-executable instructions which, when executed, perform a method for detecting malicious connections from remote users into a computer network through Remote Desktop protocol, the method being carried out by a computer having access to login logs of users, the method comprising: defining at least three aspects, each divided into several bins stored on memory of said computer and comprising a day of week aspect comprising n1 bins, a time of day aspect comprising n2 bins, a number of logins in a day aspect comprising n3 bins, wherein n1, n2 and n3 are integers; defining a model based on the at least three aspects and providing a score of log for each user; training the model on each user log during a training period in order to define a baseline of log, wherein malicious connections produce a score which is greater than the baseline and which is considered as an anomaly score; during production of the score, applying the model on said each user log to determine a production score of log and comparing the production score of log with respect to the baseline, wherein the model comprises calculating a probability density for each bin for said each user, determining a weight for each aspect of said at least three aspects, calculating the score of log from the probability density weighted by the weight determined for said each user.

* * * * *